Jan. 15, 1935.         H. P. DONLE         1,988,303
TELEVISION METHOD AND APPARATUS
Filed Aug. 14, 1931         2 Sheets-Sheet 1

Harold P. Donle
INVENTOR.
BY
ATTORNEY

Jan. 15, 1935.  H. P. DONLE  1,988,303
TELEVISION METHOD AND APPARATUS
Filed Aug. 14, 1931   2 Sheets-Sheet 2

Harold P. Donle
INVENTOR.

BY
ATTORNEY

Patented Jan. 15, 1935

1,988,303

UNITED STATES PATENT OFFICE 1,988,303

TELEVISION METHOD AND APPARATUS

Harold P. Donle, Meriden, Conn., assignor to Radio Inventions, Inc., New York, N. Y., a corporation of New York Application August 14, 1931, Serial No. 557,011

7 Claims. (Cl. 178—6)

The present invention is an improved method and means for scanning visual images, as in television transmission and reception.

More particularly this invention comprises the use of transparent rods in place of or in addition to the usual slits or other scanning apertures.

An object of my invention is to provide a brilliant visual image by means of a highly efficient optical system.

Another object of my invention is to provide a visual image which may be viewed equally well by observers stationed over a wide angle and at various distances from the image.

Another object of my invention is to provide a visual image free from distortion and/or larger than hitherto practicable without great cost and complexity of apparatus.

A further object of my invention is to provide a scanning mechanism utilizing a high speed synchronous motor, this type of motor being less expensive than the slow speed synchronous motors which are employed with scanners of the usual type.

Another object of my invention is to greatly reduce or altogether eliminate the need for very precise adjustment or machining in the manufacture of television scanning mechanisms.

A still further object of my invention is to allow any suitable type of modulated light source to be utilized in a scanning device without the usual limitations as to the luminous area thereof.

A disadvantage common to other methods of scanning is the low optical or light efficiency, which results in a dim image or requires a powerful light source in case even moderately large areas are covered by the image, and usually necessitates a darkened chamber for good visibility of the image.

Another limitation common in other methods of scanning is the narrow visual angle over which the image is visible, so that observers must assume a nearly fixed position to view the image. The same limitation often holds as to the distance of the observer from the image.

Another limitation common in other methods of scanning is the small apparent size of the image which can be enlarged only by increase of size of the light source, sacrifice of brilliance, lesser width of the visual angle, or other undesirable changes.

While there are many possible structures embodying forms of my invention, two are here shown and described, the first utilizing a rapidly revolving radially-slotted disc for line scanning, and the other utilizing a rapidly revolving radially-slotted disc whose slots carry transparent rods for line scanning. In both these forms the slow scanner employs transparent rods instead of slits.

Figure 1:
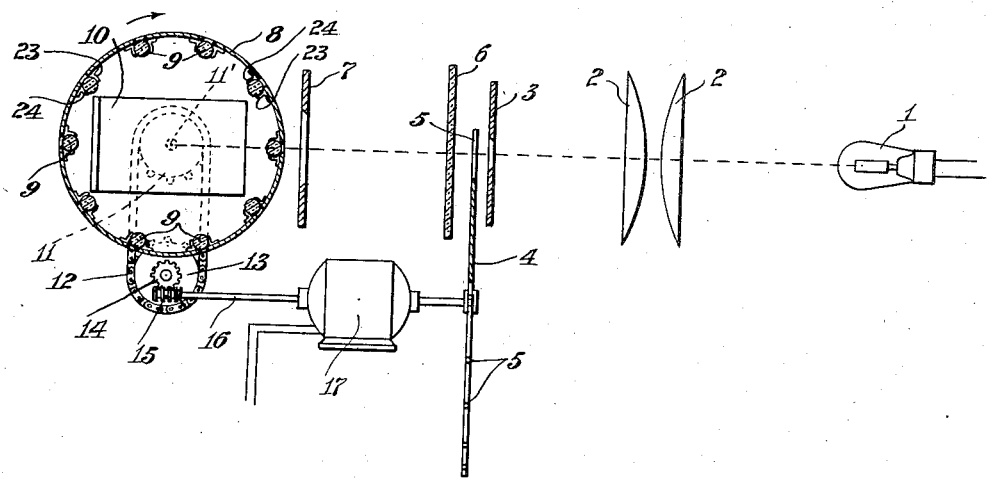
Fig. 1 is a view in elevation showing the apparatus constituting one form of my invention.
Figure 2:
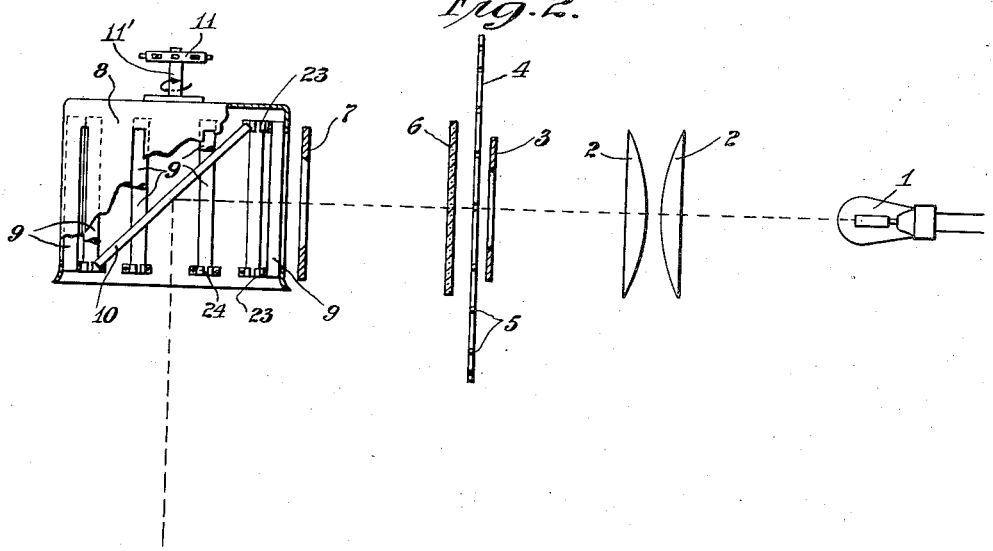
Fig. 2 is a plan view of the form of Fig. 1 (omitting the driving mechanism) and illustrating an instantaneous path of light through the optical system thereof.

Referring to Figs. 1 and 2, at 1 is represented a light source whose intensity is varied in accordance with an electrical signal from a transmitter of visual images. This is shown as of the concentrated beam type, but may be of any other suitable type, such as a flat plate glow tube or a steady source modulated by a Kerr Cell or other type light valve.

The light emitted from source 1 is shown as passing through condensing lens system 2. This system can be of any optical type appropriate to the light source, and may be omitted in case that light source 1 has its output confined to a sufficiently narrow angle.

At 3 is shown a screening or delimiting aperture serving to confine the rays of light to the desired path. The rays next pass through a slitted scanning disc 4 provided with slits 5, which operate to scan the image in one dimension only. The partly scanned image is projected upon the translucent screen 6, in accordance with the disclosures of my co-pending application Ser. No. 550,117, filed July 11, 1931, in order to increase the angle over which the final image will be visible.

The light which is emitted from each of the points of secondary light source 6 is projected over a wide angle, and 7 is a framing aperture limiting these rays to the desired width of path. At 8 is shown a revolving drum which serves to scan the image in the other dimension in accordance with the principles disclosed in my co-pending application Ser. No. 425,785 of scanning by a drum and a disc.

The drum 8 is provided with transparent rods 9 of glass or other suitable transparent material, in lieu of the usual slits, which serve as scanning apertures. These rods are preferably slightly flattened to allow their retention upon the surface of the drum with less covered and consequently inactive surface than if they were of exactly circular cross section. Their size and curvature are chosen to produce the best effect.

After passing through rods 9, the now completely scanned image is cast upon mirror 10, placed at an angle of approximately 45° which serves to reflect it through the open end of drum 8, so that an observer placed before this open end may view the image.

The drum is rotated by sprocket wheel 11, mounted upon a common shaft 11' with the drum. Chain 12 serves to drive sprocket 11, and is in turn driven by sprocket 13. Sprocket 13 is rotated by pinion 14, driven in turn by worm 15 upon shaft 16. Shaft 16 also carries scanning disc 4 and driving motor 17. The speed of this motor and the reducing gear system driving the drum therefrom are so chosen that the two scanning elements will operate in synchrony both with the rate of scanning of the received signals and with one another.

The operation of this device is partly indicated by the light rays shown in the drawings, and is inclusive of the principles of scanning by means of a drum and disc in the previously mentioned co-pending application, and also of the wide angle of vision secured by the employment of a secondary image screen, in accordance with the disclosures of the other above mentioned copending application.

One of the novel features of this invention is the use of the glass rods in place of the usual slits. These rods function to gather the light from a much larger area than would be possible with the employment of slits. The light beams emergent from the glass rods have a width which is a function of the cross-sectional curvature of the rods, and hence this element can be determined in advance in accordance with this curvature. The rods likewise collect incident light from an area equal to their projected areas, and emit this light in the form of a narrow beam. Therefore the ratio of the thickness of the rod to the width of the emergent beam represents substantially the increase of efficiency of this rod over a simple slit.

By varying the distance from rod to image screen the width of the emergent beam may be changed to a suitable width. This width should be sufficient to make each scanning line fully meet the preceding line and preferably slightly overlap the same.

The apparent size and shape of the image is determined by the length and spacing of the rods in the drum, as well as by the length and spacing of the slits or rods in the discs. By the interposition of a cylindrical lens between the disc and the screen in accordance with the disclosures of my co-pending application Ser. No. 474,088, the apparent angularity of the slits in this disc may be decreased, thus permitting the employment of a smaller disc for a given amount of permissible error in this respect, than would otherwise be possible.

When such a lens is used the distances between the disc and screen must be suitable to the optical focus of such lens.

Figure 3:
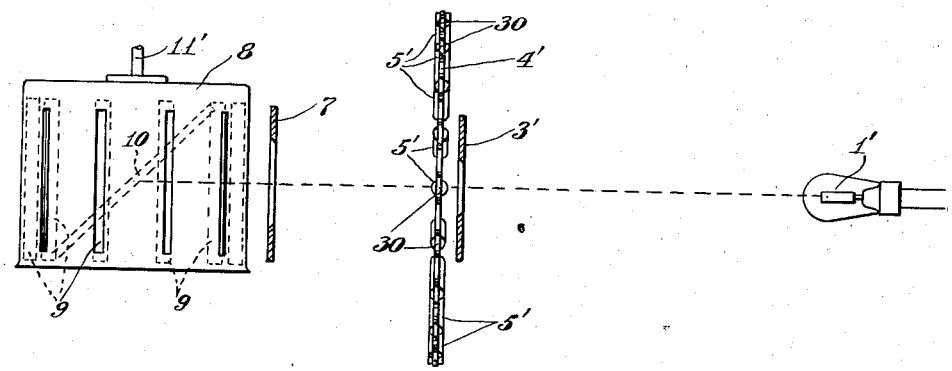
Fig. 3 is a plan view showing a scanning apparatus embodying another form of my invention.

Fig. 3 illustrates another form of this invention wherein the use of the rods is possible in both of the scanning members, thus giving their advantages in both dimensions. Referring to the drawings, the light source 1' sends its beams directly upon the disc 4' through the limiting framing aperture 3'. The disc is of the radial scanning type, but with transparent rods 5' in place of the slits. These rods function similarly to those in the drum, and scan the image in one dimension, emitting the partly scanned image in the form of highly divergent light rays. These rods may be held in place as shown, by caps 30 covering the outer end of each one, or by other suitable means.

The rays coming from the rods in the scanning disc fall upon the drum at the left of the figure through a framing aperture. All of these subsequent portions of the system may be identical with those of Figs. 1 and 2 and are similarly numbered. In this form the diffusive effect of the rods renders diffusing screen 6 unnecessary, altho it may be employed in addition.

While not confining this invention to any particular values or ratio of values of the various elements thereof, the following will serve to illustrate a preferred ratio of the physical elements, the speeds of the same, and certain values of the received picture bearing electrical signals which act upon the variable light source.

The number of slots 5 in disc 4 is equal to the quotient of the speed of motor 17 in R P S divided by the number of lines per second in the received picture. The number of rods 9 on drum 8 is equal to the quotient of the number of pictures received per second divided by the speed of drum 8 in R P S.

Figure 4:
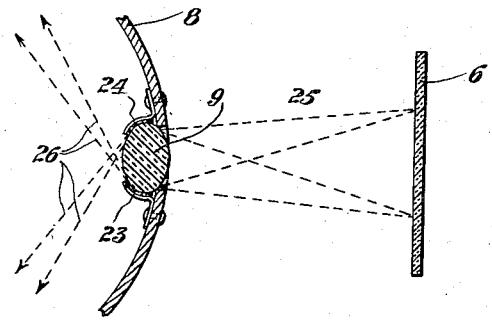
Fig. 4 represents a detail of one method of securing the rods of my invention to a scanning member, and the path of the light rays through the same.

Fig. 4 displays certain details of the mechanical fastening of the rods 9 themselves into the drum 8, by means of resilient spring members 23 and 24, preferably lined with felt or other similar material, where they contact with the surface of the glass. 25 indicates the path of light rays impinging upon the rods and 26 shows how the emergent rays are spread over an extremely wide angle. Similar mechanical methods of fastening can likewise be applied to the glass rods used in accordance with Fig. 3 upon the scanning disc, and the optical action will also be similar in this case.

Among other advantages of my invention is the high light gathering efficiency of the glass rods which serve as previously explained to gather the light over a wide angle thus serving as valuable adjuncts to the usual light gathering mirrors, lenses, etc., or even allowing the latter to be dispensed with altogether and still to maintain considerable efficiency.

Another advantage is the fact that the highly dispersive nature of the rays emergent from the rods allows a wide angle of vision for the observer thereof.

Due to the radial placement of the slits or rods in the disc the reproduced image may lack definition, especially at the sides. To remedy this, aperture 3 may be narrowed in its vertical dimension, so that the disc slits approach nearer to virtual parallelism, in respect to the section thereof actually functioning. This narrowed slit may likewise be placed on the other side of the disc, if so desired.

It is to be especially noted that the rods of this invention do not function as ordinary lenses would in the same positions. The rods are very little affected by their distances from the other parts, with which they co-operate and consequently the design of the apparatus and its adjustments are facilitated greatly by this fact.

Practically the only limit to the angle of vision of the observer with my invention is the angle formed on each edge of the drum by the line of sight of the mirror which is within the same.

Many variations of this invention are possible without departing from the spirit of the same, of which some are here mentioned.

Instead of a drum, the rods may lie along a belt moving in a direction perpendicular to the slits in the disc, thus giving them a motion substantially in a single plane, and eliminating one disturbing factor due to the employment of a drum, the rods upon whose surface vary in distance from the secondary diffusing screen as the drum rotates.

The light stops shown are not essential to the operation of the apparatus and may be omitted, as they merely serve as a convenient means of preventing the escape of unwanted light, which may be trapped in other ways, if so desired.

By the omission of co-operating lenses except a single correction lens for the radial error due to the angle of the rods in the disc, as employed according to Fig. 3, and by making the disc of small diameter, and placing it close to the drum, it is possible to make a scanner according to this invention which shall be of extremely small compass, and yet produce no more distortion than is ordinarily obtained with scanners employing discs many times the diameter. In this latter case it may be desirable to alter the rotational velocities of one or both scanning members in order to maintain the picture a suitable size. This also makes for economy of power in the operation of the apparatus, which in turn is reflected in the greater ease of securing and maintaining synchrony of the moving parts, due to their lessened inertia. Suitable synchronizing systems are disclosed in my copending applications Ser. Nos. 306,390 and 322,360 or in the copending applications of John V. L. Hogan Ser. Nos. 457,217 and 465,126, but this invention is in no wise limited to these methods of synchronization. In any case the rapid response and low degree of power necessary to shift its speed to maintain synchrony, as well as to overcome friction, windage and other losses in the normal operation of the same, is very advantageous.

Other advantages of my invention, as well as other variations from the forms herein described will be apparent to those skilled in the art, and the scope of the invention is limited only by the appended claims.

I claim:

1. A television scanner including a scanning member, means for moving said member so as to scan an optical image in one direction, transparent rod-like members having lateral walls elongated relative to their end walls and situated upon said scanning member, means for causing said rods to act as light passages between the two sides of said scanning member, means for passing light through said elongated lateral walls of said rod-like members in a direction substantially perpendicular to the longitudinal axes of said rod-like members, to and from distances such that said rod-like members act as diffusing members instead of lenses.

2. In television scanning the method of securing high optical efficiency which includes scanning an object in at least one dimension by moving a plurality of transparent rods before said object in a direction perpendicular to the axes of said rods and at a distance therefrom such that said rods act as diffusing members instead of lenses and transmit light in a direction substantially perpendicular to their axes.

3. Electro-optical scanning mechanism including a modulated light source, a series of transparent rods mounted in radial array and means for rotating said radial array before the light source so as to scan the optical output thereof in one dimension, a second series of transparent rods mounted in cylindrical array and means for rotating said cylindrical array in a plane beyond that of the radially arrayed rods, so as to scan the optical output of the first mentioned radial array of rods in the other dimension, and a reflecting surface projecting the optical output of the last mentioned cylindrical array of rods without the space enclosed by said array.

4. Television scanning apparatus including a slitted disc, means for moving said disc so as to cause scanning in one dimension, a slitted drum and means for moving said drum so as to cause scanning in another dimension, at least one of said scanning members having transparent rods substantially filling the slits thereof and focusing at a distance much less than the distance between the two scanning members.

5. Television scanning mechanism including a source of light, transparent rods, means for conveying light from said source to said rods so that the light passes through the smaller dimension of said rods in a direction substantially perpendicular to the longitudinal axes thereof, means for moving said rods in a direction substantially perpendicular to their longitudinal axes across an optical field so as to scan it in one dimension and also including other scanning means and means for moving said other scanning means so as to scan said optical field in the other dimension, the distance between said rods and said second scanning means being such that said rods act as diffusing members rather than lenses.

6. Television scanning mechanism including a substantially cylindrical transparent rod, means for moving said rod before an optical image so as to scan it in one direction, a second substantially similar rod, means for moving said second rod before said image so as to scan it in the other direction, both of said rods focusing at distances much less than the distance therebetween.

7. An optical scanning device including two sets of substantially cylindrical transparent rods, means for moving said sets of rods so that successive rods in each set optically intersect successive rods in the other sets substantially at right angles thereto and so that the point of intersection shall scan an optical image, said rods in one set being at a distance from the rods in the other set greatly in excess of the distance at which said rods focus.

HAROLD P. DONLE.